United States Patent [19]

Asar et al.

[11] 3,854,052

[45] Dec. 10, 1974

[54] METHOD OF AND APPARATUS FOR DIMENSIONALLY INSPECTING AN ARTICLE WITH A PAIR OF RADIANT ENERGY BEAMS

[75] Inventors: Madhu P. Asar, Columbus; Harry L. Maddox, Reynoldsburg, both of Ohio

[73] Assignee: Western Electric Company Incorporated, New York, N.Y.

[22] Filed: Jan. 2, 1974

[21] Appl. No.: 430,003

[52] U.S. Cl. .......... 250/560, 356/160

[51] Int. Cl. .......... G01b 11/08, G01n 21/30

[58] Field of Search .......... 250/560; 356/160

[56] References Cited

UNITED STATES PATENTS

| | | | |
|---|---|---|---|
| 2,850,645 | 9/1958 | Chilton et al. | 250/560 |
| 3,364,358 | 1/1968 | Ashworth | 250/560 X |
| 3,441,739 | 4/1969 | Clark et al. | 250/560 |

*Primary Examiner*—Archie R. Borchelt
*Assistant Examiner*—T. N. Grigsby
*Attorney, Agent, or Firm*—R. A. Lloyd

[57] ABSTRACT

To ascertain a relationship between a linear dimension of a first article with respect to a known linear dimension of a second article, a first detector is scanned across the linear dimension of the first article and a second detector is scanned across the known linear dimension of the second article at essentially the same velocity as the first detector scans across the first article. While the first detector scans across the linear dimension of the first article, a first pulse train at a first frequency is initiated and the pulses thereof are counted and stored. Then, while the second detector scans across the known dimension of the second article, a second pulse train at a second frequency is initiated and the pulses thereof are applied to sequentially subtract the stored pulse count of the first pulse train. The second frequency is at a value, with respect to the first frequency, to generate a second pulse train having a pulse count equal to the pulse count of the first pulse train when the ratio of the linear dimension of the first article to the known linear dimension of the second article is equal to a known constant. If all of the stored pulses of the first pulse train are not subtracted, a signal is generated to indicate that the ratio of the linear dimension of the first article to the known linear dimension of the second article is not equal to the known constant. The invention finds utility in ascertaining the positioning of a precious metal contact on a wire spring of a contact assembly.

23 Claims, 11 Drawing Figures

METHOD OF AND APPARATUS FOR DIMENSIONALLY INSPECTING AN ARTICLE WITH A PAIR OF RADIANT ENERGY BEAMS

BACKGROUND OF THE INVENTION

1. Field of the Invention

The present invention relates to a method of, and apparatus for, dimensionally inspecting an article with a pair of radiant energy beams, and in particular to a method of, and apparatus for, comparing an unknown dimension of an article with a predetermined dimension by comparing the number of pulses in a first pulse train, which occur while the unknown dimension of the article is scanned with one of the beams, with the number of pulses in a second pulse train, which occur while a known dimension of a member is scanned with the other of the beams.

In the manufacture of certain types of articles, it is often necessary that a dimension of an article, from a first edge of the article to a second edge of the article, be accurate within predetermined limits. One known technique for measuring such a dimension is to scan the optical path of a photodetector across the article at a known velocity, from the first edge of the article to the second edge, and to generate a first electrical signal when the first edge is detected and a second electrical signal when the second edge is detected. The first electrical signal initiates a train of pulses, at a known frequency, which are counted until the occurrence of the second electrical signal. Since the velocity of the original path of the photodetector across the article is known, and since the frequency of the occurrence of the pulses in the pulse train is known, the dimension of the article between the first and second edges thereof may be determined in accordance with the number of pulses counted. This technique, however, requires sophisticated and expensive optical scanning equipment for scanning the optical path of the photodetector across the dimension of the article, which is to be measured, at a known and constant velocity.

In the manufacture of other types of articles, it is often necessary that certain portions of the article be accurately located, or dimensioned, with respect to other portions of the article. One such article, for example, is a wire spring assembly of the type wherein a plurality of closely spaced, coplanar and parallel wire springs are each molded at one end thereof in a thermoset plastic block, and each have at the other end thereof a precious metal electrical contact welded thereto. The contact at the end of each wire is welded to a paddle shaped portion of the wire, which was initially formed by coining the end of the wire flat to the paddle shape.

Ideally, the precious metal contacts should be centered on the paddle shaped portions of the wires to avoid accidentally shorting between contacts on adjacent wires, and to ensure accurate contact alignment when the wire spring assembly is subsequently used to mate with another electrical assembly. However, this is not always the case. In the manufacture of the wire spring assemblies, the contacts are occasionally welded to the paddle shaped portions of the wires such that they overhang one side or the other of the paddle shaped portions. To the extent that a contact of a wire spring assembly overhangs the paddle shaped portions of its associated wire, by an amount greater than a predetermined amount from the edge of the wire on the same side of the overhang, the assembly is defective.

A present technique for determining whether the contacts on the paddle shaped portions of such wire spring assemblies are accurately centered is to visually inspect the assemblies. Any assembly having one or more contacts which visually appear to have a marginal overhang is then further visually inspected with an optical comparator. This procedure is not only time consuming, and therefore expensive, but is also very susceptible to operator error, with the result that defective assemblies, wire into other electrical assemblies, must subsequently be removed and replaced at considerable expense.

SUMMARY OF THE INVENTION

In accordance with the present invention, to ascertain a relationship between a linear dimension of a first member with respect to a known linear dimension of a second member, the first member is scanned with a first detector along the linear dimension thereof and a first pulse train at a first frequency is generated upon the first detector passing over the origin of, and until the first detector passes over the termination of, the linear dimension of the first member. The number of pulses in the first pulse train are counted and stored. The second member is scanned with a second detector along the known linear dimension thereof, and a second pulse train at a second frequency is generated upon the second detector passing over the origin of, and until the second detector passes over the termination of, the known linear dimension of the second member. The second frequency is at a value to generate a pulse train having a pulse count equal to the pulse count of the first pulse train when the ratio of the linear dimension of the first member to the known linear dimension of the second member is equal to a known constant. The pulses of the second pulse train are applied to sequentially subtract the stored pulse count of the first pulse train, and an indication signal is generated upon retention of a stored count of the first pulse train, which signal is indicative of a ratio of the linear dimension of the first member to the known linear dimension of the second member that is not equal to the known constant.

Preferably, an unknown dimension of an article is determined to be greater than, or less than, a predetermined dimension by scanning a first beam of radiant energy across the article along the unknown dimension thereof, by detecting when the first beam is scanned across the unknown dimension of the article, and by advancing a count at a frequency $F_1$ into a counter, having a known initial count, while the first beam is scanned across the unknown dimension. A second beam of radiant energy is scanned across a member, having a known dimension, along the known dimension thereof, at essentially the same velocity as the first beam scans across the unknown dimension of the article. While the second beam is scanned across the known dimension, a count is subtracted at a frequency $F_2$ from the counter, the frequencies $F_1$ and $F_2$ satisfying the ratio $F_2/F_1$ = predetermined dimension/known dimension of the member. After the advancing and subtracting steps, the final count in the counter is compared with the initial count therein, whereby the unknown dimension is less than, or greater than, the predetermined dimension in accordance with whether the final count has reached, or is greater than, respectively, the initial count.

In another aspect of the invention, a count at the frequency $F_2$ is advanced into the counter, having the known initial count, while the second beam is scanned across the known dimension of the member. In this case, while the first beam is scanned across the unknown dimension of the article, a count is subtracted from the counter at the frequency $F_1$. Then, after the advancing and the subtracting steps, the final count in the counter is compared with the initial count therein, whereby the unknown dimension of the article is less than, or greater than, the predetermined dimension, in accordance with whether the final count is greater than, or has reached, respectively, the initial count.

BRIEF DESCRIPTION OF THE DRAWINGS

FIGS. 1*a* and 1*b*, taken together, show partially in block diagram form, and partially in schematic form, apparatus and circuitry for inspecting contacts on wire springs with a pair of scanning laser beams in accordance with the present invention;

FIGS. 2*a* and 2*b*, taken together, illustrate schematically the circuits shown in block diagram form in FIG. 1*b*.

DETAILED DESCRIPTION

Figures 1, 1A:
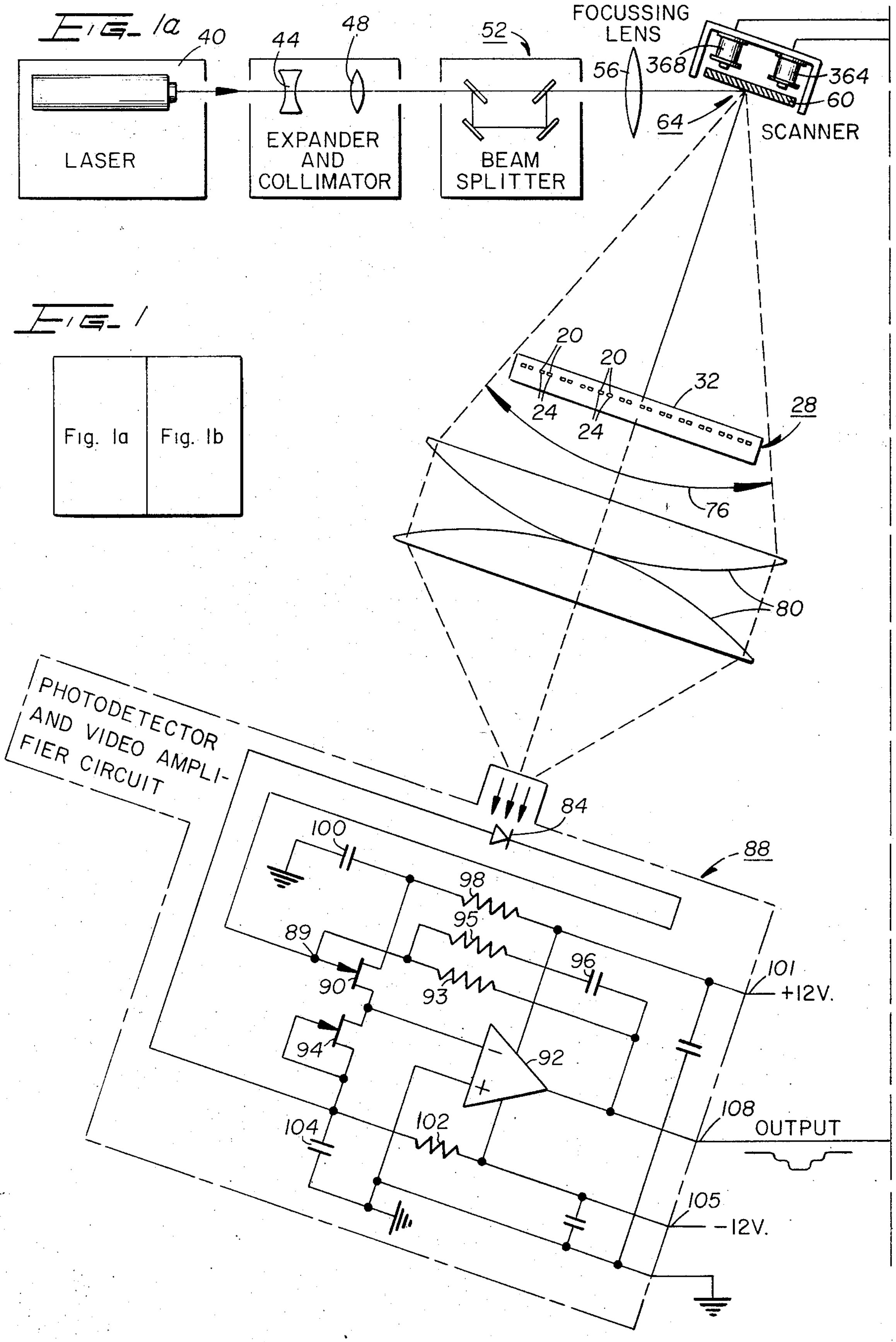
FIG. 1 shows how
FIG. 1*a* and FIG. 1*b* are related.
Figure 1B:
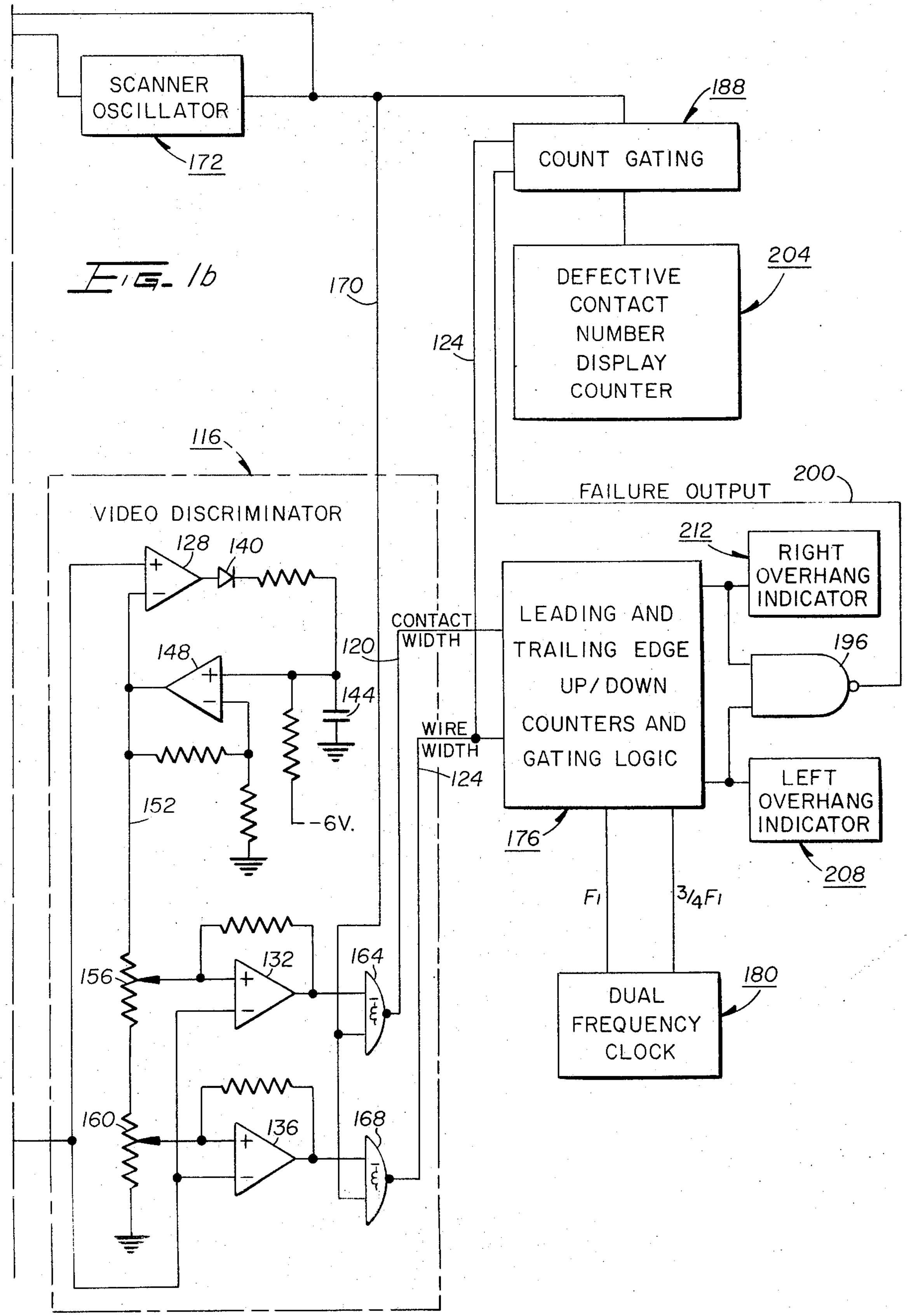

The drawings illustrate apparatus and circuitry for determining the overhang of a contact 20, welded to a wire spring 24 of a wire spring assembly 28, beyond opposite edges of the wire, by comparing the number of pulses in a first pulse train, which occur while any overhang of the contact 20 is scanned with a first beam of radiant energy, with the number of pulses in a second pulse train, which occur while the width, or diameter, of the wire spring 24 is scanned with a second beam of radiant energy. Referring in particular to FIG. 1*a* and FIG. 3, the wire spring assembly 28 includes a thermoset plastic block 32 into which a plurality of the wires 24, arranged in a closely spaced, coplanar and parallel array, are each molded at one of their ends (24 wires being shown in FIG. 1*a*). The other ends of the wires are equidistant from the block 32, and each has welded thereto, on a paddle shaped area 36 where the end of the wire has been coined flat, one of the contacts 20.

Ideally, each contact 20 should be centered on its paddle shaped area 36. This, however, is not always the case, and in welding the contact to the paddle shaped area the contact may extend beyond the paddle shaped area on either side thereof. As a result of the closely spaced nature of the wires 24, any contact 20 extending beyond, or overhanging, its associated wire 24 by more than a predetermined amount will render the wire spring assembly 28 unacceptable as a result of the increased probability of shorting with an adjacent contact, or of not properly electrically engaging another contact when the assembly 28 is mated with another electrical assembly.

Figures 3A, 3B:
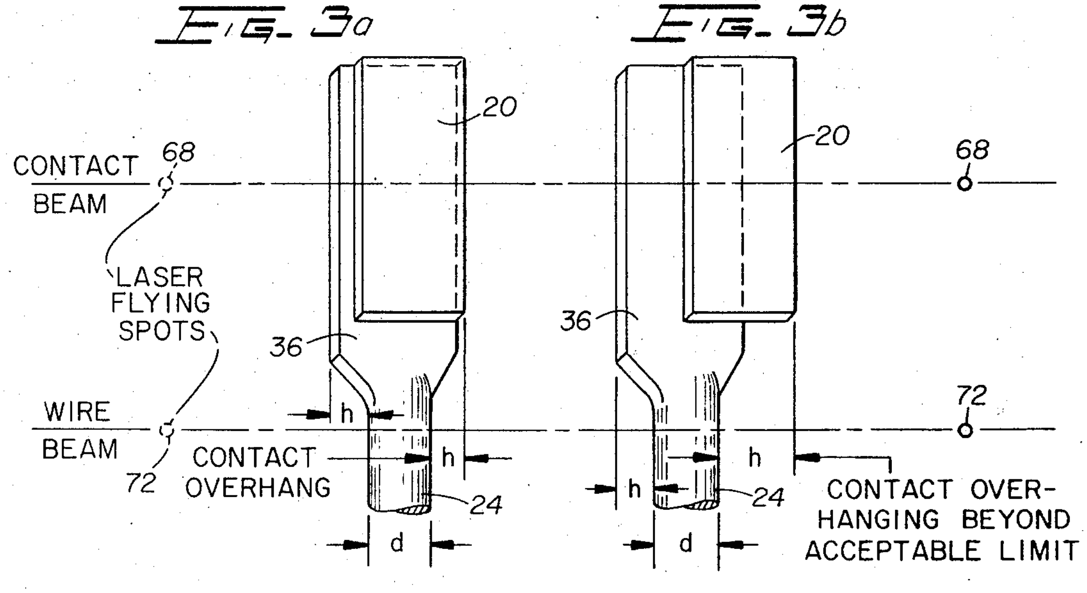
FIGS. 3*a* and 3*b* illustrate representative contact and wire spring configurations about to be scanned across by the pair of laser beams.

The maximum amount of contact overhang on either side of the wire may be expressed, by reference to FIGS. 3*a* and 3*b*, as a maximum allowable horizontal distance $h$ of the edge of the contact from the edge of the wire on the same side as the overhang, the edge of the wire being along a portion of the wire which has not been coined flat. As shown, the maximum amount of horizontal extension of an edge of a paddle shaped area 36 beyond the edge of its associated wire 24, on the same side as the extension, is also expressed as a maximum allowable horizontal distance $h$. However, for the purpose of describing the invention, the paddle shaped area 36 underlying a contact 20 shall be treated as a contact 20, and reference shall be made only to the overhang of a contact 20 beyond the edge of a wire spring 24.

Where the wire has a known diameter $d$, the maximum allowable distance $h$ between the edge of the contact and the edge of the wire may be expressed as a fraction of $d$, or $kd$, where $k$ is a predetermined fraction of $d$. Therefore, where the diameter of the wire is $d$, any contact having an overhanging edge extending more than $kd$ from the edge of the wire on the side of the overhang is defective. For the purpose of illustrating the present invention, assume that the diameter $d$ of each of the wires 24 is 0.020 inch, that the width of the paddle shaped areas 36 is 0.030 inch, and that a contact 20 may overhang the edge of its paddle shaped area by 0.010 inch; that is, the edge of a contact 20 may acceptably extend 0.015 inch, or three-fourth of the diameter $d$ of the wire, beyond the edge of the wire.

To determine the overhang of the contacts 20 on the wires 24, a monochromatic, narrow beam of light from a laser 40 is directed through an expander lens 44, which expands the laser light beam to a larger diameter, and then through a collimator lens 48, which collimates the expanded laser beam into parallel rays. A beam splitter assembly 52 is positioned to intercept the optical path of the beam from the collimator 48 and to separate the collimated beam into two vertically displaced, equal intensity, parallel beams which are directed through a focusing lens 56 and onto a plane mirror 60 of an optical scanner 64. The optical scanner of the present invention is a taut band resonant mode 20 Hz optical scanner and may be, by way of example, a Model No. L50 optical scanner sold by the Bulova American Time Products Corporation of Woodside, N.Y. The scanner 64 directs the two parallel laser beams to a wire spring assembly 28, to be inspected, positioned at the focal point of the focusing lens 56, and oriented such that the laser beams, when at the midpoint of the wire and contact array, are perpendicular to the plane of the wires. Each of the beams, at the focal point of the focusing lens 56, has a small diameter of less than 0.002 inch.

The optical scanner 64 scans the laser beams back and forth horizontally across the assembly 28, and the vertical separation between the parallel laser beams, as provided by the beam splitter assembly 52, is such that along the horizontal scan of the beams a first one of the beams 68, as shown in FIG. 3, is sequentially intercepted by all of the contacts 20 of the wire spring assembly 28, while a second one of the beams 72 is sequentially intercepted by all of the wire springs 24 associated with the contacts. The vertical orientation between the beams 68 and 72 is such that a plane defined therebetween is parallel to the axes of the wire springs 24. It is seen, therefore, that as the parallel beams 68 and 72 are swept back and forth across the contacts and wires of the assembly 28 by the optical scanner 64, the first beam 68 is sequentially intercepted by the contacts 20 while the second beam 72 is similarly sequentially intercepted by the wires 24 which support the contacts 20.

The plane mirror 60 of the optical scanner 64 oscillates harmonically through an arc sufficient to provide a 100 percent overscan of the laser beams 68 and 72 across the wire spring assembly 28, or to provide a 50 percent overscan of the beams past each end of the assembly 28, so that the contacts 20 and wires 24 are scanned by the laser beams during a relatively linear portion of the scan. As a result of the overscan, and particularly in view of the limited width of the contact and wire, the velocity of the pair of laser beams as they are scanned across an individual one of the wires and contacts is essentially constant.

As the laser beams 68 and 72 scan across the contacts 20 and wires 24 of the wire spring assembly 28 in an arc as shown at 76, all of the light from the beams that escapes past the assembly 28, that is, all of the light from the first beam 68 which is not intercepted by the contacts 20 or the paddle shaped areas 36, and all of the light from the second beam 72 which is not intercepted by the wires 24, is focused by a pair of collecting lenses 80 onto a photodetector diode 84 of a photodetector and video amplifier circuit 88. Current drawn by the photodetector diode 84 as a result of radiant, or laser, energy incident thereon, is applied to a summing point 89 of an operational amplifier formed by a field-effect transistor (FET) 90, a high gain amplifier 92 and a feedback resistor 93. The FET 90 is connected in series with a FET 94, which is matched, or identical, in its parametric behavior with the FET 90. In the configuration shown, the FET 94 acts as a constant current source, and since the source and the gate of the FET 94 are connected together, the resultant constant current that flows through both of the FET's 90 and 94 causes the potential between the gate and the source of the FET 90 to also be zero. In other words, the voltage at the source of the FET 90 is always essentially identical to the voltage at its gate. This provides a conventional high impedance, buffer input stage, for the operational amplifier.

The source of the FET 90 is connected to the inverting input of the high gain amplifier 92, and a negative feedback is provided from the output of the amplifier 92, to the summing point 89, through the resistor 93. In this manner, current drawn by the photodetector 84, as a result of radiant energy incident thereon, is converted to an amplified voltage signal, at the output of the amplifier 92, which is proportional to the photodetector current, and therefore to the radiant energy incident upon the photodetector. Two additional feedback elements, a resistor 95 and a capacitor 96, limit the high frequency response of the circuit 88 to an optimum value to maximize the signal to noise ratio thereof, a resistor 98 and a capacitor 100 form a high frequency filter for a positive voltage source 101, and a resistor 102 and a capacitor 104 form a high frequency filter for a negative voltage source 105.

The signal at an output 108 of the photodetector and video amplifier circuit 88, which is the amplified voltage signal at the output of the amplifier 92, is linear with respect to the radiant energy incident upon the photodetector 84. With the laser beams 68 and 72 being of equal intensity, the output from the circuit 88, with neither laser beam 68 or 72 incident upon the photodetecotr 84, is $V_0$ = zero volts or reference ground, with one beam incident on the photodetector is $V_1$ volts, and with both beams incident on the photodetector is $2V_1$ volts.

Figures 4, 5, 6:
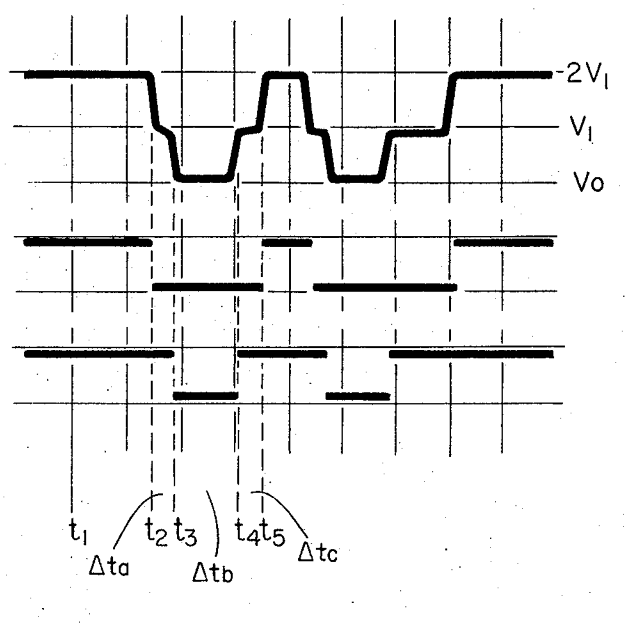
FIG. 4 shows a waveform at the output of the photodetector and video amplifier circuit of FIG. 1*a* in response to the contacts and wires of FIGS. 3*a* and 3*b* being scanned by the laser beams.
FIGS. 5 and 6 show waveforms of the contact width signal and the wire diameter signal, respectively, at the output of the video discriminator of FIG. 1*b* in response to the input of FIG. 4.

With reference to FIGS. 3*a*, 3*b* and 4, FIG. 4 showing the signal at the output 108 of the photodetector and video amplifier circuit 88 as the beams 68 and 72 scan across the contacts and wires of FIGS. 3*a* and 3*b*, it can be seen, with respect to the signal on the left, that at a time $t_1$, as both beams approach the contact and wire of FIG. 3*a* and while neither beam is intercepted by the contact and wire, so that both beams impinge on the photodetector 84, the voltage at the output 108 of the circuit 88 is $2V_1$. At a time $t_2$, when the beam 68 is intercepted by the left edge of the contact 20 (actually by the left edge of the paddle shaped area 36), and does not therefore impinge upon the photodetector 84, but while the beam 72 has not yet been intercepted by the wire 24 and is still impinging upon the photodetector 84, the output from the circuit 88 changes to $V_1$ volts. In other words, the output of the circuit 88 drops to $V_1$ volts at the leading, or leftmost, edge of the contact 20. At a time $t_3$, after a time interval $\Delta t_a$ from the time $t_2$, the beam 72 ceases to impinge upon the photodetector 84 as it is intercepted by the leading, or leftmost, edge of the wire 24, and the output from the photodetector and video amplifier circuit 88 changes to $V_0$ volts. At a time $t_4$, after a time interval $\Delta t_b$ from the time $t_3$, the beam 72 again impinges upon the photodetector 84 as its sweep carries it past the lagging, or rightmost, edge of the wire 24, which again provides $V_1$ volts at the output of the circuit 88. Finally, at a time $t_5$, after a time interval $\Delta t_c$ from the time $t_4$, the beam 68 again impinges upon the photodetector 84, along with the beam 72, as it passes beyond the lagging, or rightmost, edge of the contact 20, returning the output from the circuit 88 to $2V_1$ volts.

At this point it should again be noted that while the beam 68 has been described as being intercepted by the leading edge of the contact 20, or as passing beyond the lagging edge of the contact 20, that the paddle shaped area 36, rather than the contact 20, may initially intercept the beam 68, or that the beam 68 may ultimately pass beyond the paddle shaped area. This is obvious in the contact and wire configuration of FIGS. 3*a* and 3*b*, where the contact 20 is of such a size, with respect to the paddle shaped area 36, that it might not completely overlie the paddle shaped area. For the purpose of practicing the invention, however, it is unimportant whether, for intercepting the beam 68 from reaching the photodetector 84, the edges of the contact overlie the edges of the paddle shaped area, since it is the overall extension of the sides of the end of a wire 24 from the associated sides of the wire itself which is of concern. Accordingly, and as previously set forth, in the description of the invention the beam 68 shall be described as being intercepted by, and passing over, the leading and lagging edges of a contact 20, irrespective of whether the beam is actually intercepted by, or passes over, a leading or lagging edge of a paddle shaped area 36 on which a contact 20 is mounted.

It should now be evident that due to the essentially constant velocity of the laser beams 68 and 72 as they scan across an individual contact 20 and wire 24, that the time interval $\Delta t_a$, between the interception of the beam 68 by the contact 20 and of the beam 72 by the wire 24, is proportional to the overhang of the contact to the left side of the wire, and that the time interval $\Delta t_c$, between the passage of the beam 72 past the wire and the beam 68 past the contact, is proportional to the overhang of the contact to the right side of the wire. Furthermore, the time interval $\Delta t_b$, when the beam 72 is intercepted by the wire 24, is proportional to the diameter of the wire. Therefore, with a wire 24 of a known diameter $d$, and with a determined maximum permissible overhang $h$ of a contact 20 on either side of the wire, if the ratio of $\Delta t_a$ to $\Delta t_b$, or $\Delta t_c$ to $\Delta t_b$, is greater than a predetermined value, then the contact overhangs by an excessive amount the left or the right side, respectively, of the wire. For example, the wires 24 of the wire spring assembly 28, as described, have a known diameter of 0.020 inch and the maximum permissible overhang of a contact 20 on either side of a wire is 0.015 inch. Accordingly, if the ratio of $\Delta t_a$ to $\Delta t_b$, or $\Delta t_c$ to $\Delta t_b$, for any contact 20 and its associated wire 24 is greater than the ratio of 0.015 inch to 0.020 inch, or is greater than three-fourths, then the current overhangs the wire by an excessive amount and the assembly 28 is defective. That is, if the ratio of $\Delta t_a/\Delta t_b$, or $\Delta t_c/\Delta t_b$, is greater than the ratio of the predetermined dimension/the known diameter of the wire, then the contact overhangs the wire by an amount in excess of the predetermined dimension, and the switch 28 is defective. In a similar manner, if the ratio of $\Delta t_a/\Delta t_b$, or $\Delta t_c/\Delta t_b$, is less than the ratio of the predetermined dimension/the known diameter of the wire, then the contact overhangs the wire by less than the predetermined dimension.

As the laser beams 68 and 72 have a finite diameter (0.002 inch), and as the response of the photodetector diode 84 is not instantaneous, the rise and fall times of the signal at the output 108 of the photodetector and video amplifier circuit 88 are finite, resulting in slight slopes. Therefore, to obtain a comparison of $\Delta t_a$ and $\Delta t_c$ with $\Delta t_b$, it is first necessary to obtain square wave logic compatible signals, representative of the signal at the output 108 of the circuit 88, for gating purposes. This is accomplished with a video discriminator circuit 116, which receives the output from the circuit 88, detects the 50 percent points of the transitional slopes thereof, and provides on a first output conductor 120 thereof a signal, shown in FIG. 5, representative of the width of the contact 20, and on a second output conductor 124 a signal, shown in FIG. 6, representative of the diameter of the wire 24. It is to be noted that the contact width signal of FIG. 5 has a leading and a lagging edge occurring at the times $t_2$ and $t_5$, respectively, and that the wire diameter signal of FIG. 6 has a leading and a lagging edge occurring at the times $t_3$ and $t_4$, respectively. Accordingly, the times $t_2$ through $t_5$ occur at the midpoint, or the 50 percent points, of the transitional slopes shown in FIG. 4.

More particularly, the signal at the output 108 of the photodetector and video amplifier circuit 88 is applied to the positive input of an operational amplifier 128, and to the negative input of each of two operational amplifiers 132 and 136, of the video discriminator 116. With the input signal thereto at $2V_1$ volts at the time $t_1$, as shown in FIG. 4, the operational amplifier 128 applies a positive voltage through a diode 140 to one plate of a peak holding capacitor 144 and to the positive input of an operational amplifier 148. The peak holding capacitor 144 maintains the maximum value of the output from the operational amplifier 128 at the positive input of the operational amplifier 148 to provide, on a conductor 152 connected with the output of the operational amplifier 148 and to the negative input of the amplifier 128, a potential having a value of $2V_1$ volts. The voltage on the conductor 152 is applied through two sliding contact resistors 156 and 160 to ground. The sliding contact of the resistor 156 is adjusted to apply to the positive input of the operational amplifier 132 a voltage equal to 75 percent of the value of the voltage $2V_1$, or $3/2\ V_1$ volts, and the sliding contact on the resistor 160 is adjusted to apply to the positive input of the operational amplifier 136 a voltage equal to 25 percent of the value of the voltage $2V_1$, or $1/2\ V_1$ volts. That is, the operational amplifier 132 has applied to its positive input a voltage equal to the voltage at the output 108 of the photodetector circuit 88 at the 50 percent point along the transitional slope of FIG. 4 from $2V_1$ volts to $V_1$ volts, and the operational amplifier 136 has applied to its positive input a voltage equal to the voltage at the output 108 of the photodetector circuit 88 at the 50 percent point along the transitional slope from $V_1$ volts to $V_0$ volts. The voltage applied at the positive input of the operational amplifiers 132 and 136 is, of course, dependent upon the maximum value of the voltage $2V_1$ as applied to the positive input of the operational amplifier 128, which provides automatic level control for the video discriminator circuit 116 to compensate for variations in laser light intensity as detected by the photodetector 84 of the photodetector and video amplifier circuit 88 and, therefore, for variations in the value of the voltage $V_1$.

The output from the operational amplifier 132 is applied to one input of a two input NAND gate 164, the output of which provides the contact width signal on the output conductor 120 of the video discriminator circuit 116, and the output from the operational amplifier 136 is applied to one input of a two input NAND gate 168, the output of which provides the wire width, or wire diameter, signal on the output conductor 124 of the circuit 116. The second input to each NAND gate 164 and 168 is applied over a conductor 170, from an oscillator 172 which controls the sweep of the optical scanner 64, for enabling the NAND gates 164 and 168 to pass a signal from the operational amplifiers 132 and 136 to the output conductors 120 and 124 during the time that the assembly 28 is being scanned by the laser beams for detecting the overhang of the contacts thereof, and for blinding the NAND gates 164 and 168 during the retrace of the laser beams.

In the specific description of the operation of the square wave logic circuits of the invention, reference will be made to logic levels having a O or a 1 state. With respect to the square wave logic disclosed, a 1 state is merely a logic level which is discretely more positive than a logic level having a 0 state. With this in mind, and referring to FIGS. 4–6, at the time $t_1$, with the scanner oscillator 172 applying a 1 state over the conductor 170 to each of the NAND gates 164 and 168, to enable the gates to pass therethrough the signals from the operational amplifiers 132 and 136, when the voltage on the output 108 of the photodetector and video amplifier circuit 88 is $2V_1$ volts, the output from each operational amplifier 132 and 136 is 0. This results, as shown in FIGS. 5 and 6, in a 1 level on each of the output conductors 120 and 124 of the video discriminator circuit 116. At the time $t_2$, at which point the output signal from the circuit 88 is 50 percent of the way between its original value of $2V_1$ volts and the value $V_1$ volts, the potential at the negative input of the operational amplifier 132 equals, and then becomes negative with respect to, the potential at the positive input thereof, resulting in a 1 state at the output thereof as applied to the NAND gate 164. This, in turn, provides at the time $t_2$, as shown in FIG. 5, a 0 at the output of the NAND gate 164 as applied over the conductor 120. As previously described, this is the point at which the laser beam 68 is initially intercepted by the leading edge of a contact 20. At the time $t_3$, at which point the signal at the output 108 of the circuit 88 is 50 percent of the way between the value $V_1$ volts and $V_0$ volts, and at which point the laser beam 72 is intercepted by the leading edge of the wire 24, the potential at the negative input of the operational amplifier 136 equals, and then becomes negative with respect to, the potential at the positive input thereof, resulting in a 1 state at the output thereof as applied to the NAND gate 168. This, in turn, generates at the time $t_3$, as shown in FIG. 6, a 0 from the output of the NAND gate 168 as applied over the conductor 124.

At the time $t_4$, at which point the beam 72 is passing beyond the lagging edge of the wire 24 and the signal at the output 108 of the circuit 88 has risen 50 percent of the way between the previous value of $V_0$ volts and $V_1$ volts, the negative input of the operational amplifier 136 again becomes positive with respect to the positive input thereof, resulting in a 0 at the output thereof and, accordingly, a 1 on the conductor 124 from the NAND gate 168. Finally, at the time $t_5$, at which point the beam 68 is passing beyond the lagging edge of the contact 20 and the signal at the output 108 of the circuit 88 has increased to a value 50 percent of the way between $V_1$ volts and $2V_1$ volts, the negative input of the operational amplifier 132 again becomes positive with respect to the positive input thereof, resulting in a 0 at the output thereof and, therefore, a 1 on the conductor 120 from the NAND gate 164.

It is seen that the video discriminator 116 has converted the signal at the output 108 of the photodetector and video amplifier circuit 88, as shown in FIG. 4, into two individual outputs from the video discriminator circuit 116, as shown in FIGS. 5 and 6, which are compatible with square wave logic. That is, on the output conductor 120 a signal has been generated having a leading edge transition from 1 to 0 at the time $t_2$ when the beam 68 is intercepted by the contact 20, and having a lagging edge transition from 0 to 1 at the time $t_5$ when the beam 68 passes beyond the contact 20, and on the output conductor 124 a signal has been generated having a leading edge transition from 1 to 0 at the time $t_3$ when the laser beam 72 is intercepted by the wire 24, and having a lagging edge transition from 0 to 1 at the time $t_4$ when the beam 72 passes beyond the wire 24.

Assume, as set forth previously, that the wire 24 has a diameter of 0.020 inch, and that the contact 20 may overhang either side of the wire up to a maximum of 0.015 inch. Therefore, for any wire and contact where either the time $\Delta t_a$, between the two leading edges of the signals on the output conductors 120 and 124 of the video discriminator 116, or where the time $\Delta t_c$, between the two lagging edges of the signals on the output conductors 120 and 124, exceeds 3/4 of the time $\Delta t_b$, between the leading and lagging edges of the signal on the conductor 124, the wire and contact are defective and the wire spring assembly 28 is defective. In other words, for the diameter of the wire and the maximum allowable overhang as set forth, if $\Delta t_a$ or $\Delta t_c$ exceeds 3/4 $\Delta t_b$, then the contact overhangs an edge of the wire by an amount in excess of 0.015 inch.

To compare the times $\Delta t_a$, $\Delta t_b$ and $\Delta t_c$, the signal on each of the conductors 120 and 124 of the video discriminator circuit 116 is applied as an input to a dual counter circuit 176 which is selectively stepped up or down in accordance with inputs provided thereto from a dual frequency clock 180. To check contact overhang to the left, or leading, edge of a wire, the 0 level on the conductor 120 at the time $t_2$, as shown in FIG. 5, enables a first counter in the dual counter 176 to be counted up, from an initial count of zero, by a pulse train from the clock 180 at a clock rate F. The first counter continues to count up, and to accumulate the count, which is an indication of the time interval $\Delta t_a$, until the occurrence of the 0 level on the conductor 124, as shown in FIG. 6, at the time $t_3$. At this time, the clock rate of the pulse train from the dual frequency clock 180, as applied to the first counter, is changed to 3/4 F, and the first counter is commanded to count down from its accumulated count. Simultaneously with the count down of the first counter at the clock rate 3/4 F, a second counter of the dual counter 176 is commanded to count up, from an initial count of zero, at the clock rate 3/4 F. At the time $t_4$, when the level on the conductor 124 changes from 0 to 1, the count down of the first counter is terminated, and the count up of the second counter is terminated, the total count down of the first counter, and the total count up of the second counter, being an induction of the time interval $\Delta t_b$. At this point the final count in the first counter is determined and compared with the initial count therein. Assuming that the contact overhang to the left side of the wire is within 0.015 inch, the first counter will have been counted down to its initial count of zero. Conversely, if the contact overhangs the left side of the wire by more than 0.015 inch, the first counter will register a final count greater than zero, and the wire and contact will be defective as a result of an excessive contact overhang to the left side of the wire.

To determine the overhang of the contact to the right side of the wire, at the time $t_4$, when the count up of the second counter is terminated, the frequency of the pulse train applied to the second counter from the dual frequency clock 180 is changed to F, and the second counter is commanded to count down from its accumulated count. The count down of the second counter at the clock rate F continues until the time $t_5$, when the level on the conductor 120 again becomes 1, at which time the count down of the second counter is terminated. The total count down of the second counter is an indication of the time interval $\Delta t_c$, and the final count therein is determined and compared with the initial count therein. If the count is greater than zero, or the initial count, than the contact overhangs the wire to the right side by less than 0.015 inch. Conversely, if the counter has been counted down to its initial count of zero, than the contact overhangs the wire to the right side by an amount in excess of 0.015 inch, and the wire and contact are defective as a result of an excessive contact overhang to the right side of the wire. In other words, during the time interval $\Delta t_a$, the first counter is counted up, from an initial count of zero, at the clock rate F, and is then counted down, during the time interval $\Delta t_b$, from its accumulated count, at the clock rate 3/4 F. If the final count registered in the first counter is zero, then the contact overhangs the left edge of the wire by less than 0.015 inch. In a similar fashion, during the time interval $\Delta t_b$, the second counter is counted up, from an initial count of zero, at the clock rate 3/4 F, and is then counted down, during the time interval $\Delta t_c$, from its accumulated count, at the clock rate F. If the final count registered in the second counter is greater than zero, then the contact overhangs the right edge of the wire by less than 0.015 inch.

During the time that a wire spring assembly 28 is scanned by the beams 68 and 72, each 1 to 0 level transition on the conductor 124 is also applied as an input to a count gating circuit 188. The count gating circuit 188 advances one count with each 1 to 0 transition to accumulate therewithin a sequential numerical count representative of the particular wire and contact, of an assembly 28, being inspected. The count gating circuit 188 also receives as a second input thereto the output from a gate 196, over a conductor 200, which is responsive, upon the occurrence of a contact failure resulting from either an excessive left or right contact overhang, to terminate the counting of the count gating circuit 188 and to cause to be displayed, on a display counter 204, the number of the defective contact and wire. This is accomplished by providing an enabling signal to a first input of the gate 196 from the first counter of the dual counter 176 whenever the final count therein, at the time $t_4$, is greater than zero, and by providing an enabling signal to a second input of the gate 196 from the second counter of the dual counter 176 whenever, at the time $t_5$, the final count therein is equal to its initial count of zero. The enabling signal from the first counter is also applied to a left overhang indicator circuit 208 to generate a visual indication that the failure is a result of an excessive contact overhang to the left side of a wire, and the enabling signal from the second counter is also applied to a right overhang indicator circuit 212 to generate a visual indication that the failure is due to an excessive contact overhang to the right side of a wire. At the beginning of an inspecting scan of a wire spring assembly 28 by the laser beams 68 and 72, an output from the oscillator 172 is applied as a third input to the count gating circuit 188 to reset the counter 204 to a count of zero for sequentially counting the wires and contacts as they are scanned.

More particularly, referring to FIGS. *2a* and *2b*, the dual frequency clock 180 continuously generates on a conductor *h* a clock signal having either a frequency F or 3/4 F in accordance with the absence or presence, respectively, of a 0 level on the conductor 124 of the video discriminator 116. That is, when the beam 72 is not intercepted by a wire 24, the level on the conductor 124 is 1 and the frequency of the signal on the conductor *h* is F, and when the beam 72 intercepted by a wire 24 the level on the conductor 124 is 0 and the frequency of the signal on the conductor *h* is 3/4 F. This is accomplished by applying the output from an oscillator 216 to a pair of binary counters 220 and 224 which are arranged, with a gate 228, to divide the clock frequency from the oscillator 216 by "three" and to apply a signal, or pulse train, having the frequency F, to a first input of a gate 232. The signal from the oscillator 216 is also applied to a pair of binary counters 236 and 240 which are arranged to divide the clock frequency from the oscillator 216 by "four" and to apply a signal, or pulse train, having the frequency 3/4 F, to a first input of a gate 244.

To select the frequency F at the first input of the gate 232, or the frequency 3/4 F at the first input of the gates 244, to be applied over the conductor *h*, the level on the conductor 124 is applied to a second input of the gate 232, to a first input of a gate 248, and to a first gate input of a flip-flop 252 of a data synchronizer circuit 256. When the beam 72 is not intercepted by a wire 24, the 1 on the conductor 124 enables the gate 232 to apply to a first input of a gate 260 the clock frequency F and provides, through an enabling signal at the first gate of the flip-flop 252, a 1 at the "inverted" output of the flip-flop in response to clock pulses being applied to the clock input thereof from the gate 260. The 1 at the "inverted" output of the flip-flop 252 is applied both over a conductor *c* and to a second input of the gate 248, providing a 0 at the output of the gate 248 which in turn is applied to a second input of the gate 244, to a second gate input of the flip-flop 252 to inhibit the flip-flop from switching to its "normal" state, and over a conductor *b*. With a 0 at its second input, the output of the gate 244 is maintained at a 1 state and is applied to a second input of the gate 260. This enables the gate 260 to pass to the conductor h the pulse train, or clock signal, at the frequency F as applied at the first input thereof.

At the time $t_3$, when the laser beam 72 is intercepted by a wire 24 and the level on the conductor 124 goes to 0, a constant 1 level is provided at the outputs of the gates 232 and 248, and the 1 level is removed from the first gate input of the flip-flop 252 of the data synchronizer circuit 256. The 1 at the output of the gate 248 is applied to a second gate input of the flip-flop 252, over the conductor b, and to the second input of the gate 244 to enable the gate 244 to pass to the second input of the gate 260 the signal having the frequency 3/4 F. With a 1 at its first input, the gate 260 applies over the conductor h the clock signal, or pulse train, having the frequency 3/4 F.

The first clock signal on the conductor h, after the signal on the conductor 124 goes to 0, switches the flip-flop 252 of the data synchronizer 256 to apply a 0 over the conductor *c* and to change the level on a conductor f from 0 to 1. Therefore, it is seen that when the beam 72 is not being intercepted by a wire 24 and the level on the conductor 124 is 1, a signal having a frequency F is applied over the conductor *h*, and when the beam 72 is intercepted by a wire 24 and the level on the conductor 124 is 0, a signal having a frequency 3/4 F is applied over the conductor *h*. As will later be apparent, the function of the data synchronizer 256 is to ensure that the clock signal, or pulse train, on the conductor *h* is at the proper frequency in accordance with the required count up or down conditions of the first and second counters. At the time $t_4$, when the beam 72 passes beyond the lagging edge of the wire 24, the level on the conductor 124 returns to 1, the data synchronizer circuit 256 returns to its original state, and a clock signal having the frequency F is again applied over the conductor *h*.

Prior to the time that the beam 68 is intercepted by a contact 20, the level on the conductor 120 is 1 and is applied both to a first input of a gate 264, and to the input of a monostable multivibrator 268, of a contact edge marker circuit 272. At the time $t_2$, when the beam 68 is intercepted by the leading edge of a contact 20, the level on the conductor 120 goes to 0, providing a 1 at the output of the gates 264 and a momentary transition from 1 to 0 at the output of the multivibrator 268. This momentary transition is applied over each of two conductors *d* and *g*, as well as to a second input of the gate 264 to block out the effect of any noise on the conductor 120 on the output of the gate 264 as the beam 68 is first intercepted by the contact 20. The output from the gate 264 is applied as an input to a monostable multivibrator 276 which, upon the occurrence of a 1 to 0 transition applied thereto, applies over a conductor e a momentary transition from 1 to 0. Therefore, at the time $t_5$, when the beam 68 passes beyond the lagging edge of the contact 20 and the level on the conductor 120 goes from 0 to 1, the output from the gate 264 goes from 1 to 0 and a momentary transition from 1 to 0 is applied over the conductor e by the multivibrator 276.

Figures 2, 2A:
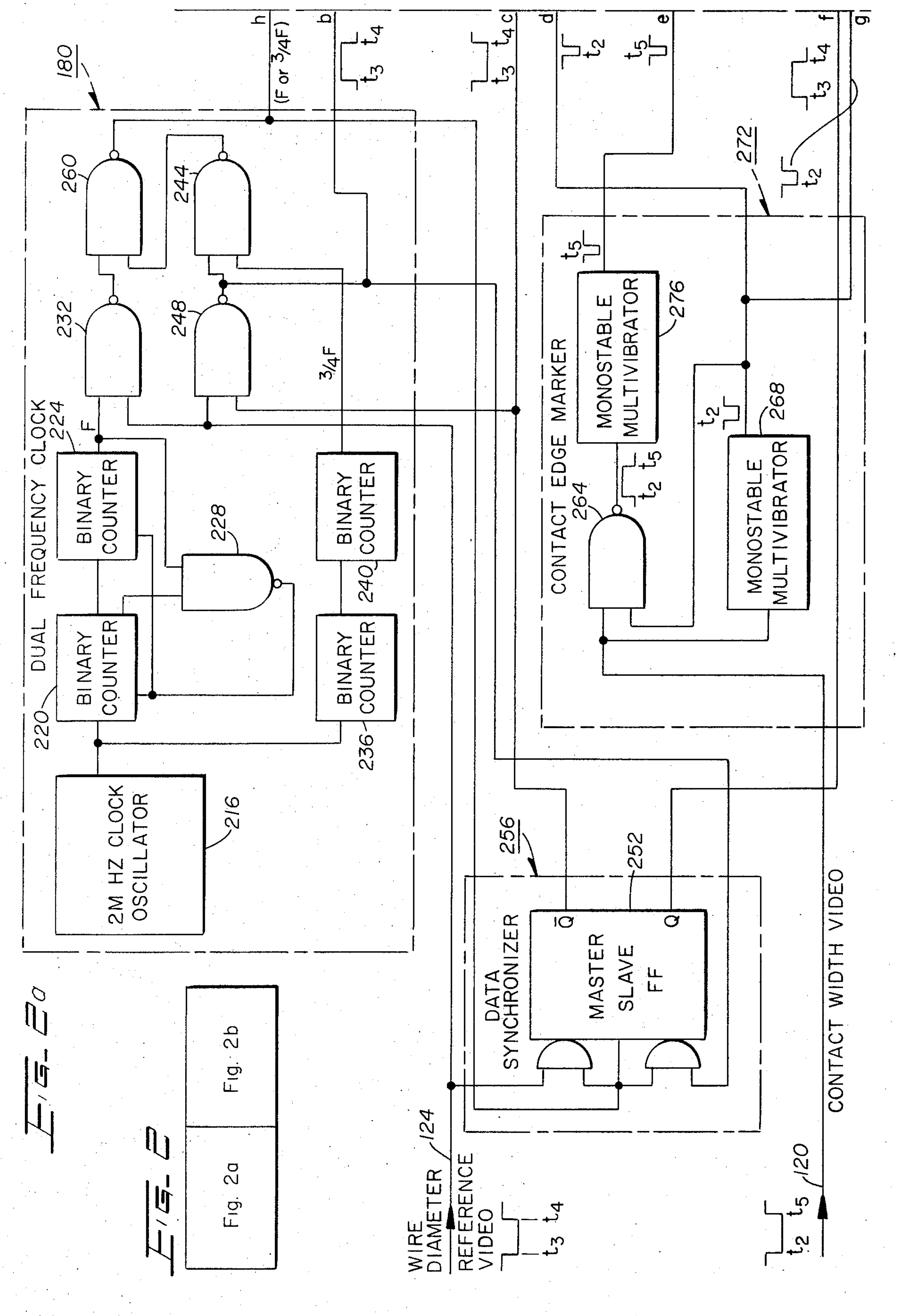
FIG. 2 shows how
FIG. 2*a* and FIG. 2*b* are related.
Figure 2B:
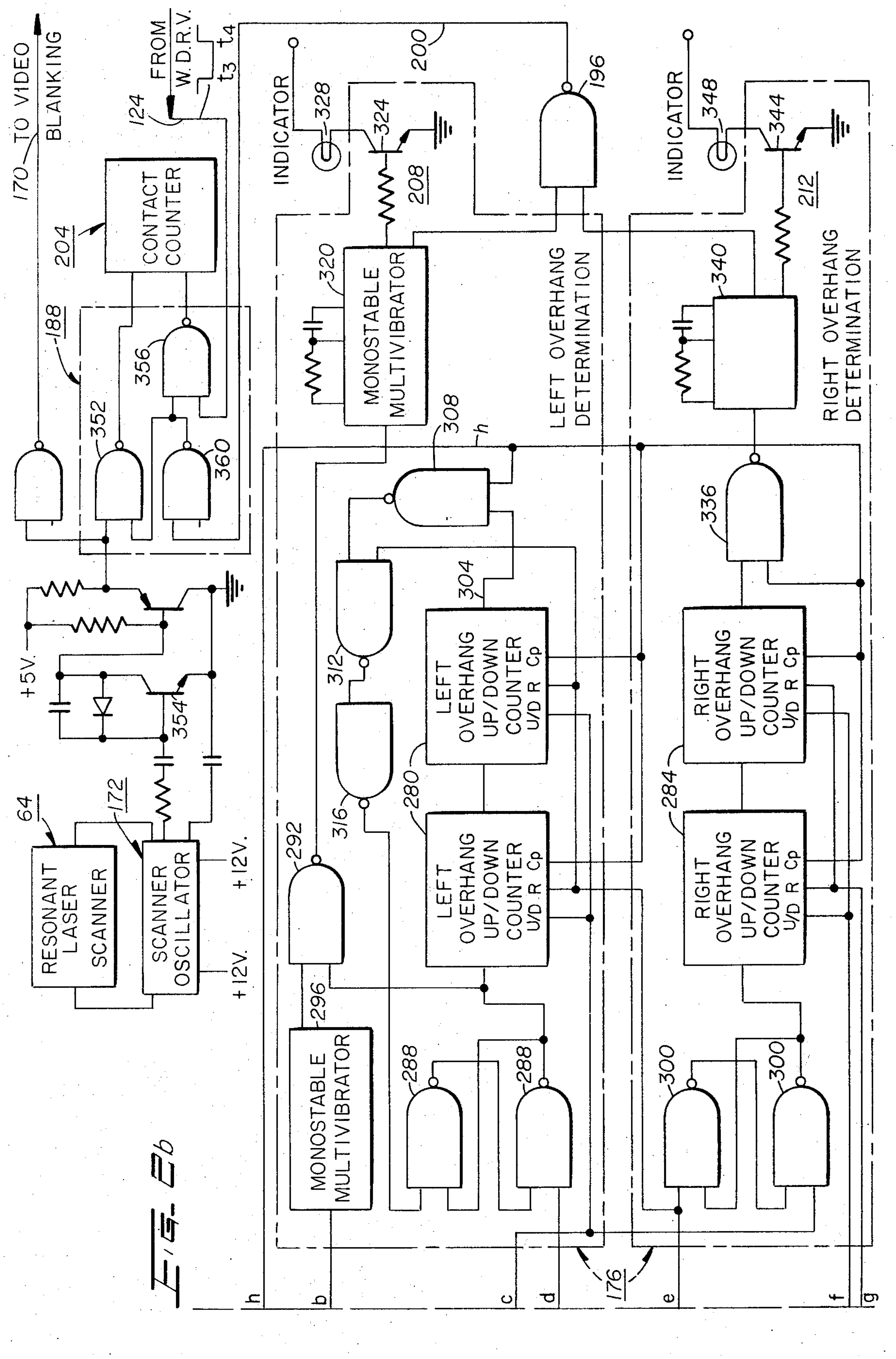

With particular reference to FIG. 2*b*, the clock signal, or pulse train, on the conductor *h* is applied to the clock inputs of a first pair of up-down counters 280 as well as to the clock inputs of a second pair of up-down counters 284. With neither beam 68 or 72 intercepted by a contact or wire (i.e., at the time $t_1$) neither pair of counters 280 or 284 is enabled to accumulate a count therewithin in response to the clock signal on the conductor *h* which, at this time, is at the frequency F.

At the time $t_2$, at which point the beam 68 is intercepted by the leading, or leftmost, edge of a contact 20, the levels on both of the conductors *d* and *g* momentarily go from 1 to 0, while the level on the conductor *c* remains at 1. The level on the conductor *d* is applied as an input to one gate of a pair of gates 288, which are arranged as a set-reset flip-flop for enabling the counters 280 to accumulate a count therewithin in response to a clock input thereto. This switches the output of the gates 288 from 0 to 1, which is applied as an enable input to the counters 280 as well as to a first input of a gate 292. With a 1 state on the conductor *c* applied to the up/down inputs of the counters 280, which directs the counters 280 to count up, the 1 at the output of the gates 288 enables the counters 280 to begin accumulating therein, from an initial count of zero, the number of clock pulses applied thereto, over the conductor *h*, at the frequency F. The 1 at the output of the gates 288 also enables the gate 292 to pass therethrough a signal from a monostable multivibrator 296 at the time $t_4$, should the gates 288 be providing a 1 at their output at that time. The signal on the conductor g at the time $t_2$ resets the second pair of counters 284 to zero in the event that a count was previously accumulated therein.

During the time $\Delta t_a$, which is the time from $t_2$ to $t_3$ when the beam 68 is being intercepted by the contact 20, and before the beam 72 is intercepted by the wire 24, the counters 280 store therein, or accumulate, the number of clock pulses received in the pulse train, on the conductor h at the frequency F. At the time $t_3$, when the beam 72 is initially intercepted by the leading, or leftmost edge, of the wire 24 associated with the contact 20 which is intercepting the beam 68, the clock frequency on the conductor *h* changes from F to 3/4 F, in the manner previously described, and the level on the conductor *c* changes from 1 to 0 to direct the first pair of counters 280 to count down, from the count accumulated therein during the time $\Delta t_a$, at the clock rate 3/4 F. The signal on the conductor c is also applied as an input to one gate of a pair of gates 300, which are arranged as a set-reset flip-flop for enabling the counter 284 to accumulate a count therewithin in response to a clock input thereto. This switches the output of the gates 300 from 0 to 1 to enable the second pair of counters 284 to begin accumulating, from an initial count of zero, the number of clock pulses applied thereto at the clock rate 3/4 F. Also at this time the level on the conductor *f*, applied to the up/down inputs of the counters 284, changes from 0 to 1 to direct the counters 284 to count up in response to the clock pulses applied thereto.

During the time $\Delta t_b$, which is the time from $t_3$ to $t_4$ when the beam 72 is being intercepted by the wire 24, the second pair of counters 284 count up from an initial count of zero and accumulate therein the number of clock pulses received in the pulse train on the conductor *h* at the frequency 3/4 F. Also at this time the first pair of counters 280 count down, at the clock frequency rate of 3/4 F, from the count previously accumulated therein during the time $\Delta t_a$. As was previously set forth, with a wire diameter of 0.020 inch and a maximum permissible contact overhang of 0.015 inch, the first pair of counters 280 will reach a count of zero before the time $t_4$ if the contact overhang to the left, or leading, edge of the wire is 0.015 inch or less, and the counters 280 will have therewithin a count in excess of zero if, at the time $t_4$, the contact overhang to the left side of the wire is in excess of 0.015 inch. Accordingly, the level on an output 304 of the first pair of counters 280, which is 1 when the counters have a count of zero accumulated therein and 0 when the accumulated count is in excess of zero, is applied to a first input of a gate 308, the other input of which is interrogated with each clock pulse on the conductor *h*.

If the first pair of counters 280 reach a count of zero during the time $\Delta t_b$ and before the time $t_4$, indicating that the contact 20 overhangs the left side of the wire 24 by 0.015 inch or less, the output from the counters 280 changes from 0 to 1 to enable the gate 308 to pass therethrough, and to a first input of a gate 312, the next clock pulse on the conductor *h*. At this time, a second input of the gate 312 has the 1 signal on the conductor e applied thereto, enabling the gate 312 to pass the clock signal to an input of a gate 316 which, in turn, applies the clock signal to a second input of the pair of gates 288 to switch the output of the gates 288 from 1 to 0. The 0 at the output of the gates 288 terminates further counting down of the pair of counters 280, and prevents the gate 292 from passing therethrough the signal which is applied thereto, at the time $t_4$, by the monostable multivibrator 296.

At the time $t_4$, when the beam 72 passes beyond the lagging, or right, edge of the wire 24, the level on the conductor *b*, applied to the multivibrator 296, changes from 1 to 0. With a negative going transition at its input, the multivibrator 296 provides a momentary transition from 0 to 1 at its output, which is applied to a second input of the gate 292. If, before this time, the first counter 280 has reached a count of zero, a 0 from the output of the gates 288 will be at the first input of the gate 292, and the gate 292 will not pass therethrough the signal from the multivibrator 296. However, if the contact overhangs the left side of the wire by an amount in excess of 0.015 inch, the counters 280 will not have reached a count of zero by this time, the gates 288 will be applying a 1 to the first input of the gate 292, and the gate 292 will pass the signal from the multivibrator 296, as a momentary 1 to 0 transition, to an input of a monostable multivibrator 320 of the left overhang indicator 208. With a negative going transition at its input, the multivibrator 320 intermittently applies a 1 to 0 transition to a transistor 324 to render the transistor conductive to intermittently light an indicator lamp 328 which visually indicates that the contact being scanned overhangs to the left of its associated wire by more than 0.015 inch. The multivibrator 320 also applies the 1 to 0 transition to the first input of the gate 196 to generate at the output therof a 0 to 1 transition which indicates an unacceptable contact overhang.

Also, at the time $t_4$, the frequency of the clock on the conductor *h* again becomes F, the level on the conductor *c* changes from 0 to 1 in preparation for inspecting a subsequent wire and contact, and the level on the conductor *f* changes from 1 to 0 to direct the second pair of counters 284 to count down, at the clock frequency F, from the count accumulated therein during the time interval $\Delta t_b$.

During the time interval $\Delta t_c$, which is the time from $t_4$ to $t_5$ during which the beam 68 continues to be intercepted by the contact 20, but after the beam 72 has passed beyond the lagging, or right edge, of the wire 24, the second pair of counters 284 count down, at the clock frequency rate of F, from the count accumulated therein during the time interval $\Delta t_b$ at the clock frequency rate of 3/4 F. Again, as previously set forth, with a wire diameter of 0.020 inch and a maximum permissible contact overhang of 0.015 inch, the second counter 284 will not reach a count of zero before the time $t_5$ if the contact overhang to the right, or the lagging, edge of the wire is 0.015 inch or less, and the counter 284 will reach a count of zero prior to the time $t_5$ if the contact overhang to the right side of the wire is greater than 0.015 inch. Accordingly, the output from the counter 284, which is 0 for an accumulated count greater than zero and 1 for a count of zero, is applied to a first input of a gate 336, the other input of which is interrogated by each clock pulse on the conductor *h*.

If, at a time prior to $t_5$, the counter 284 reaches a count of zero, the output thereof, as applied to the gate 336, changes from 0 to 1 to enable the gate 336 to pass therethrough the next clock pulse, as a momentary 1 to 0 transition, to a monostable multivibrator 340 of the right overhang indicator 212. With a negative going transition at its input, the multivibrator 340 intermittently applies a 0 to 1 transition to a transistor 344 to render the transistor conductive to intermittently light an indicator lamp 348. This visibly indicates that the contact being scanned overhangs to the right its associated wire by more than 0.015 inch. The multivibrator 340 also applies the 1 to 0 transition to a second input of the gate 196 to generate at the output thereof a 0 to 1 transition to indicate an unacceptable contact overhang.

At the time $t_5$ the level on the conductor *e* momentarily changes from 1 to 0 and is applied both to the gates 300, to change the output thereof from 1 to 0 to terminate further counting down by the counters 284, as well as to reset inputs of the first counters 280, to insure that the counters are reset to zero prior to a left overhang determination of a subsequent wire 24 and contact 20. If by this time the counters 284 have not reached a count of zero, the output of the counters will remain at 0 to prevent the passing of a clock pulse on the conductor *h* through the gate 336 as an indication of an excessive contact overhang to the right of a wire. Also, if the contact 20 and wire 24 inspected in the manner as set forth is not defective as a result of a contact overhang to the left or right side of the wire by an excessive amount, then a subsequent wire and contact is inspected in an identical manner.

FIG. 3*b* illustrates a contact 20 having an excessive overhang to the right side of a wire 24. For this wire and contact configuration, as the beams 68 and 72 scan across the contact and wire, the output from the photodetector and video amplifier circuit 88 is shown as the right hand waveform of FIG. 4, and the outputs from the video discriminator circuit 116 are shown as the right hand waveforms of FIGS. 5 and 6. In this case, the second pair of counters 284, after counting up at the frequency 3/4 F from an initial count of zero during the time period $\Delta t_b$, and then counting down from their accumulated count at the frequency F during the time period $\Delta t_c$, will reach their initial count of zero before the end of the time period $\Delta t_c$ to indicate an excessive contact overhang to the right side of the wire. It is understood, of course, that the time periods referred to for the right hand waveforms of FIGS. 4–6 correspond to the time periods as shown for the left hand waveforms of FIGS. 4–6.

In the event that a wire and contact of a wire spring assembly 28 is defective, it is desirable to know which wire and contact is defective to facilitate the repair of the assembly. Identification of a defective wire and contact is accomplished with the count gating circuit 188 and the number display counter 204, which together determine the number of the wire and contact being inspected and, in the event of a defective wire and contact, provide a visual indication of the number of the defective wire and contact, each wire and contact of the assembly 28 being sequentially numbered along the inspecting direction of scan of the beams 68 and 72.

More specifically, during the retrace of the laser beams 68 and 72 after an inspection scan of the wires and contacts of the assembly 28, the scanner oscillator circuit 172 applies over the conductor 170 a 0 to the gates 164 and 168 of the video discriminator circuit 116 to blank the output from the video discriminator circuit. During this time, the scanner oscillator 172 also applies to a first input of a gate 352 of the count gating circuit 188, through an amplifier circuit 354, a 1 to generate, with a 1 at a second input to the gate, a 0 at the output of the gate for resetting, to a count of zero, the contact counter circuit 204. Then, during an inspection scan of wires and contacts of the assembly 28 by the beams 68 and 72, the scanner oscillator circuit 172 applies a 1 state over the conductor 170 to enable the video discriminator circuit 116 to provide outputs therefrom, and applies to the gate 352 a 0 state to generate, at the output thereof, a 1 state to enable the counter 204 to accumulate a count therewithin in accordance with the occurrence of a signal applied thereto.

The signal on the conductor 124 is applied to a first input of a gate 356 of the count gating circuit 188 to generate, with a 1 state at a second input thereof, a 0 to 1 transition at the output thereof at each time $t_3$ to advance into the contact counter 204 one count every time that the laser beam 72 is intercepted by a leading edge of a wire 24. Therefore, the contact counter 204 accumulates therewithin a sequential count, representative of the particular wire and contact being inspected by the laser beams 68 and 72, in accordance with each signal received over the conductor 124 representative of interception of the beam 72 by a wire 24.

If, during the inspection of the wires 24 and contacts 20 of a wire spring assembly 28, a contact is found to have an excessive overhang to the left or right side of its associated wire, the 1 state generated at the output of the gate 196 during the inspection of that contact and wire is applied as an input to a gate 360 of the count gating circuit 188 to generate, at the output thereof, a 0 which is applied both to a second input of the gate 356 and to a second input of the gate 352. The 0 at the second input of the gate 356 prevents the gate from passing therethrough the signal on the conductor 124 to terminate further counting of wires by the counter 204, and the 0 at the second input of the gate 352 prevents the gate 352 from passing therethrough the signal on the first input thereof during the retrace of the beams 68 and 72 to prevent resetting of the contact counter 204 during the retrace of the beams. This provides at the contact counter 204 a visual indication of the number of the defective wire and contact. It is understood, of course, that at this time one of the indicator lamps 328 or 348 will be intermittently illuminated to indicate whether the particular contact has an excessive overhang to the left or to the right side of its associated wire.

Referring also to FIG. 1*a*, it is seen that the optical scanner 64 includes two electromagnetic coils 364 and 368. The coil 364 is intermittently energized by the scanner oscillator 172 to impart sinusoidal, or harmonic, oscillating movement to the plane mirror 60 which is mounted as a taut band resonant scanner, and the coil 368 senses the position of the mirror 60 along its sinusoidal oscillation and applies a feedback signal to the scanner oscillator 172 to control the application of the signal to the coil 364. The signal from the oscillator 172 which energizes the coil 364 also controls the blanking signal to the video discriminator 116 as well as the reset signal to the count gating circuit 188 through the amplifier 372. It should be particularly noted that in the practice of the invention, since the known diameter of the wire provides a distance-to-time conversion calibration factor, and since digital ratios are employed to compare the overhang of a contact with the diameter of a wire, the practice of the invention does not require precise laser beam scanning speed, it only being necessary that the beams scan at an essentially constant velocity across individual ones of the contacts and wires.

While one embodiment of the invention has been described in detail, it is understood that various other modifications and embodiments may be devised by one skilled in the art without departing from the spirit and scope of the invention. For example, while the invention has been described in terms of determining whether the left or right overhang of a contact on a wire, having a known diameter of 0.020 inch, is less than or greater than a maximum permissible overhang of 0.015 inch, by using the frequencies F and 3/4 F, it is to be understood that any amount of overhang of a contact on a wire of any known diameter may readily be determined in accordance with the teachings of the invention by using clock frequencies having a ratio determined in accordance with the ratio $kF/F = F_2/F_1 =$ maximum allowable contact overhang/known diameter of wire.

With the foregoing in mind it is, of course, within the further contemplation of the invention to determine whether a single unknown linear dimension of any article is greater than or less than a predetermined dimension. In this case, the teachings for determining either the left or right overhang of a contact on a wire may be used. That is, the unknown dimension of the article may first be scanned with the beam 68 while advancing a count into a counter, having a known initial count, at a frequency $F_1$ during the time that the beam 68 is intercepted by the article along the unknown dimension. Then, a member having a known linear dimension is scanned therealong with the beam 72, at essentially the same velocity as the beam 68 scans across the article along the unknown dimension, while subtracting a count from the counter at a frequency $F_2$ during the time that the beam 72 is intercepted by the member along the known dimension. With the frequencies $F_1$ and $F_2$ satisfying the ratio $F_2/F_1$ = predetermined dimension/known dimension of member, by comparing the final count in the counter with the initial count the unknown dimension of the article is determined to be less than, or greater than, the predetermined dimension in accordance with whether the final count has reached, or is greater than, respectively, the initial count. Alternatively, the known dimension of the member may be scanned with the beam 72 while advancing a count into the counter, having a known initial count, at the frequency $F_2$ during the time that the beam 72 is intercepted by the member along the known dimension. Then, the unknown dimension of the article is scanned with the beam 68 while subtracting a count from the counter at the frequency $F_1$ during the time that the beam 68 is intercepted by the article along the unknown dimension. In this case, with the frequencies $F_1$ and $F_2$ satisfying the above ratio, the unknown dimension of the article is determined to be less than, or greater than, the predetermined dimension in accordance with whether the final count is greater than, or has reached, respectively, the initial count.

Also, in the description of the invention, and as shown in FIGS. 3*a* and 3*b* of the drawings, it has been assumed that the orientation of a contact 20 on a wire 24 is such that the edges of the contact are parallel to the edges of the wire. This, of course, might not always be the case, in that a contact 20 could be welded to a paddle shaped area 36 of a wire 24 such that its edges are skewed with respect to the edges of the wire. In this case, the edges of the contact would overhang the corresponding edges of the wire by varying amounts along their length. It is therefore within the further contemplation of the invention that each contact could be scanned several times by the beam 68, with each scan occurring at an individual and spaced position along the edge of the contact, to determine whether any portion of the edge of the contact overhangs its corresponding edge of the wire in excess of a predetermined amount. Such a raster type scan could easily be achieved either by incrementally vertically deflecting the beam 68 after each horizontal scan thereof, or by incrementally vertically displacing the wire spring switch assembly 28 after each horizontal scan of the beams 68 and 72 thereacross.

What is claimed is:

1. In a method of ascertaining a relationship between a linear dimension of a first member with respect to a known linear dimension of a second member:

scanning the first member with a first detector along the linear dimension thereof;

initiating the generation of a first pulse train at a first frequency upon the first detector passing over the origin of, and until the first detector passes over the termination of, the linear dimension of the first member;

counting and storing the pulses of the first pulse train;

scanning the second member with a second detector along the known linear dimension thereof;

initiating the generation of a second pulse train at a second frequency upon the second detector passing over the origin of, and until the second detector passes over the termination of, the known linear dimension of the second member, the second frequency being at a value to generate a pulse train having a pulse count equal to the pulse count of the first pulse train when the ratio of the linear dimension of the first member to the known linear dimension of the second member is equal to a known constant;

applying the pulses of the second pulse train to sequentially subtract the stored pulse count of the first pulse train, and generating an indication signal upon retention of a stored count of the first pulse train which is indicative of a ratio of the linear dimension of the first member to the known linear dimension of the second member that is not equal to the known constant.

2. In a method of ascertaining a relationship between a known linear dimension of a first member with respect to a linear dimension of a second member;

scanning the first member with a first detector along the known linear dimension thereof;

initiating the generation of a first pulse train at a first frequency upon the first detector passing over the origin of, and until the first detector passes over the termination of, the known linear dimension of the first member;

counting and storing the pulses of the first pulse train;

scanning the second member with a second detector along the linear dimension thereof;

initiating the generation of a second pulse train at a second frequency upon the second detector passing over the origin of, and until the second detector passes over the termination of, the linear dimension of the second member, the second frequency being at a value to generate a pulse train having a pulse count equal to the pulse count of the first pulse train when the ratio of the known linear dimension of the first member to the linear dimension of the second member is equal to a known constant;

applying the pulses of the second pulse train to sequentially subtract the stored pulse count of the first pulse train, and generating an indication signal upon retention of a stored count of the first pulse train which is indicative of a ratio of the known linear dimension of the first member to the linear dimension of the second member that is not equal to the known constant.

3. In a method of determining whether an unknown dimension of an article is greater than, or less than, a predetermined dimension:

imparting relative movement between a first beam of radiant energy and the article to scan the beam across the article along the unknown dimension thereof;

detecting when the first beam is scanned across the unknown dimension of the article;

advancing a count at a frequency $F_1$ into a counter, having a known initial count, while the first beam is scanned across the unknown dimension of the article;

imparting relative movement between a second beam of radiant energy and a member having a known dimension to scan the beam across the member, along the known dimension thereof, at essentially the same velocity as the first beam scans across the unknown dimension of the article;

detecting when the second beam is scanned across the known dimension of the member;

subtracting a count at a frequency $F_2$ from the counter while the second beam is scanned across the known dimension of the member, the frequencies $F_1$ and $F_2$ satisfying the ratio $F_2/F_1$ = predetermined dimension/known dimension of the member, and comparing, after the advancing and subtracting steps, the final count in the counter with the initial count, whereby the unknown dimension is less than, or greater than, the predetermined dimension in accordance with whether the final count has reached, or is greater than, respectively, the initial count.

4. In the method as set forth in claim 3, wherein:

the step of imparting relative movement between the first beam and the article comprises scanning the first beam of radiant energy along a path which crosses the article along the unknown dimension thereof to intercept the beam, with the article, while it is scanned across the unknown dimension;

the step of imparting relative movement between the second beam and the member comprises scanning the second beam of radiant energy along a path which crosses the member along the known dimension thereof, at essentially the same velocity as the first beam crosses the article along the unknown dimension, to intercept the beam, with the member, while it is scanned across the known dimension;

the step of detecting when the first beam is scanned across the unknown dimension of the article comprises detecting when the first beam is intercepted by the article alon the unknown dimension thereof, and the step of detecting when the second beam is scanned across the known dimension of the member comprises detecting when the second beam is intercepted by the member along the known dimension thereof.

5. In the method as set forth in claim 4, wherein the two scanning steps are sequential.

6. In a method of comparing an unknown dimension of an article with a predetermined dimension:

imparting relative movement between a first beam of radiant energy and the article to scan the beam across the article along the unknown dimension thereof;

detecting when the first beam is scanned across the unknown dimension of the article;

subtracting a count, at a frequency $F_1$, from a counter, having a known initial count, while the first beam is scanned across the unknown dimension of the article;

imparting relative movement between a second beam of radiant energy and a member having a known dimension to scan the beam across the member, along the known dimension thereof, at essentially the same velocity as the first beam scans across the unknown dimension of the article;

detecting when the second beam is scanned across the known dimension of the member;

advancing a count, at a frequency $F_2$, into the counter while the second beam is scanned across the known dimension of the member, the frequencies $F_1$ and $F_2$ satisfying the ratio $F_2/F_1$ = predetermined dimension/known dimension of the member, and comparing, after the advancing and the subtracting steps, the final count in the counter with the initial count, whereby the unknown dimension of the article is less than, or greater than, the predetermined dimension, in accordance with whether the final count in the counter is greater than, or has reached, respectively, the initial count.

7. In the method as set forth in claim 6, wherein:

the step of imparting relative movement between the first beam and the article comprises scanning the first beam of radiant energy along a path which crosses the article along the unknown dimension thereof to intercept the beam, with the article, while it is scanned across the unknown dimension;

the step of imparting relative movement between the second beam and the member comprises scanning the second beam of radiant energy along a path which crosses the member along the known dimension thereof, at essentially the same velocity as the first beam crosses the article along the unknown dimension, to intercept the beam, with the member, while it is scanned across the known dimension;

the step of detecting when the first beam is scanned across the unknown dimension of the article comprises detecting when the first beam is intercepted by the article along the unknown dimension thereof, and the step of detecting when the second beam is scanned across the known dimension of the member comprises detecting when the second beam is intercepted by the member along the known dimension thereof.

8. In the method as set forth in claim 7, wherein the two scanning steps are sequential.

9. In a method of ascertaining the existence of a predetermined relationship of a first dimension of a first quantity with respect to a second dimension of a second quantity:

scanning the first and second quantities with a detector for detecting the origins and terminations of the first and the second dimensions;

sensing the origin of the first dimension to initiate the generation and the storage of a first train of pulses at a first frequency until the sensing of the origin of the second dimension;

sensing the termination of the second dimension to initiate the generation of a second train of pulses at the first frequency until the sensing of the termination of the first dimension;

initiating the generation and storage of a third train of pulses, upon sensing the origin of the second dimension and until sensing the termination of the second dimension, at a second frequency sufficient to generate a number of pulses at least equal to the number of pulses in each of the stored first and second trains of pulses if the predetermined relationship exists;

applying the third train of pulses to sequentially subtract all the pulses in the stored first train of pulses, and applying the second train of pulses to sequentially subtract less than all the pulses in the stored third train of pulses, if there is the predetermined relationships between the first and second dimensions, and generating an indicating signal if the predetermined relationship does not exist.

10. In a method of ascertaining whether first and second edges of an article each overhang an individual one of first and second edges of a support by an amount less than, or in excess of, a predetermined amount, the article having a width between its first and second edges which is greater than the width of the support between its first and second edges, and the article being positioned on the support with its width parallel to the width of the support and with its first and second edges overhanging the first and second edges, respectively, of the support, the first and second edges of the support extending beyond the length of the article and the distance between the first and second edges of the support being known:

scanning a pair of parallel beams of radiant energy along paths to scan the first beam across the article from the first to the second edge thereof, and to scan the second beam across the support from the first to the second edge thereof, to intercept the first beam, from passing beyond the article, with the article between the first and second edges thereof and to intercept the second beam, from passing beyond the support, with the support between the first and the second edges thereof, the beams being oriented such that a plane therebetween is parallel to the edges of the support;

detecting when the first beam is intercepted by the article and when the second beam is intercepted by the support;

advancing a count at a frequency $F_1$ into a first counter having a known initial count, when the first beam is intercepted by the first edge of the article and until the second beam is intercepted by the first edge of the support;

subtracting a count at a frequency $F_2$ from the first counter, and advancing a count at the frequency $F_2$ into a second counter having a known initial count, when the second beam is intercepted by the first edge of the support and until the second beam scans across the second edge of the support, the frequencies $F_1$ and $F_2$ satisfying the ratio $F_2/F_1 =$ predetermined amount of overhang of the article/known width of the support;

generating a first signal, when the second beam scans across the second edge of the support, having a first state if the count in the first counter has reached the initial count therein to indicate that the first edge of the article overhangs the first edge of the support by less than the predetermined amount, and having a second state if the count in the first counter is greater than the initial count therein to indicate that the first edge of the article overhangs the first edge of the support in excess of the predetermined amount;

subtracting a count at the frequency $F_1$ from the second counter when the second beam scans across the second edge of the support and until the first beam scans across the second edge of the article, and generating a second signal, when the first beam scans across the second edge of the article, having a first state if the count in the second counter has reached the initial count therein to indicate that the second edge of the article overhangs the second edge of the support in excess of the predetermined amount, and having a second state if the count in the second counter is greater than the initial count therein to indicate that the second edge of the article overhangs the second edge of the support by less than the predetermined amount.

11. In a method as set forth in claim 10, wherein the detecting steps comprise:

focusing the first and second beams, which pass beyond the article and support, respectively, without being intercepted thereby, onto a photodetector for sensing when both beams are incident thereon, when only the second beam is incident thereon, and when neither beam is incident thereon, and for generating an output signal in accordance therewith;

generating, in response to the output signal from the photodetector, a third signal having a leading edge occurring when the first beam is intercepted by the first edge of the article and a lagging edge occurring when the first beam scans across the second edge of the article, and generating, in response to the output signal from the photodetector, a fourth signal having a leading edge occurring when the second beam is intercepted by the first edge of the support and a lagging edge occurring when the second beam scans across the second edge of the support.

12. In a method as set forth in claim 11, wherein:

the step of advancing a count at the frequency $F_1$ into the first counter comprises detecting the leading edges of the third and fourth signals and advancing the count, at the frequency $F_1$, into the first counter when the leading edge of the third signal is detected and until the leading edge of the fourth signal is detected;

the step of subtracting a count at the frequency $F_2$ from the first counter and advancing a count at the frequency $F_2$ into the second counter comprises detecting the lagging edge of the second signal and subtracting a count at the frequency $F_2$ from the first counter, and advancing a count at the frequency $F_2$ into the second counter, when the leading edge of the fourth signal is detected and until the lagging edge thereof is detected, and the step of subtracting a count at the frequency $F_1$ from the second counter comprises detecting the lagging edge of the third signal and subtracting a count at the frequency $F_1$ from the second counter when the lagging edge of the fourth signal is detected and until the lagging edge of the third signal is detected.

13. In a system for measuring an unknown dimension of an article with respect to a predetermined dimension:

means for imparting relative movement between a first beam of radiant energy and the article to scan the first beam across the article along the unknown dimension thereof and to intercept the first beam, with the article, as it is scanned across the unknown dimension;

means for imparting relative movement between a second beam of radiant energy and a member having a known dimension to scan the beam across the member, along the known dimension thereof, at essentially the same velocity as the first beam is scanned across the unknown dimension of the article, to intercept the second beam, with the member, as it is scanned across the known dimension thereof;

means for detecting when the first beam is intercepted by the article along the unknown dimension thereof and when the second beam is intercepted by the member along the known dimension thereof;

a counter for receiving a clock signal and for selectively increasing or decreasing the count therewithin at a rate in accordance with the frequency of the clock signal;

means, responsive to the detecting means, for applying a clock signal at a frequency $F_1$ to the counter to advance a count into the counter at the frequency $F_1$ during the time that the first beam is intercepted by the article along the unknown dimension thereof;

means, responsive to the detecting means, for applying a clock signal at a frequency $F_2$ to the counter for subtracting a count from the counter at the frequency $F_2$ during the time that the second beam is intercepted by the member along the known dimension thereof, the frequencies $F_1$ and $F_2$ satisfying the ratio $F_2/F_1 =$ the predetermined dimension/the known dimension of the member, and means, responsive after the first beam has scanned across the unknown dimension of the article and the second beam has scanned across the known dimension of the member, for generating a signal having a first state if the count subtracted from the counter is at least equal to the count advanced into the counter to indicate that the unknown dimension of the article is less than the predetermined dimension, and having a second state if the count subtracted from the counter is less than the count advanced into the counter to indicate that the unknown dimension of the article is in excess of the predetermined dimension.

14. In a system as set forth in claim 13, wherein:
the means for imparting relative movement between the first beam and the article includes means for scanning the first beam along a path which crosses the article along the unknown dimension thereof;
the means for imparting relative movement between the second beam and the member includes means for scanning the second beam along a path which crosses the member along the known dimension thereof, at essentially the same velocity as the first beam crossed the article along the unknown dimension thereof, and
the detecting means includes photodetecting means, positioned on the sides of the article and member opposite from the sides thereof which intercept the first and second beams, for detecting the first and second beams which pass beyond the article and the member, respectively, without being intercepted thereby, and for generating signals in accordance therewith.

15. In the system as set forth in claim 14 wherein the means for scanning the first beam across the article, and the means for scanning the second beam across the member, sequentially scan the first beam across the article and the second beam across the member.

16. In a system for comparing an unknown dimension of an article with a predetermined dimension:
means for imparting relative movement between a first beam of radiant energy and the article to scan the first beam across the article along the unknown dimension thereof and to intercept the first beam, with the article, as it is scanned across the unknown dimension;
means for imparting relative movement between a second beam of radiant energy and a member having a known dimension to scan the beam across the member, along the known dimension thereof, at essentially the same velocity as the first beam is scanned across the unknown dimension of the article, to intercept the second beam, with the member, as it is scanned across the known dimension thereof;
means for detecting when the first beam is intercepted by the article along the unknown dimension thereof and when the second beam is intercepted by the member along the known dimension thereof;
a counter for receiving a clock signal and for selectively increasing or decreasing the count therewithin at a rate in accordance with the frequency of the clock signal;
means, responsive to the detecting means, for applying a clock signal at a frequency $F_2$ to the counter to advance a count into the counter at the frequency $F_2$ during the time that the second beam is intercepted by the member along the known dimension thereof;
means, responsive to the detecting means for applying a clock signal at a frequency $F_1$ to the counter for subtracting a count from the counter at the frequency $F_1$ during the time that the first beam is intercepted by the article along the unknown dimension thereof, the frequencies $F_1$ and $F_2$ satisfying the ratio $F_2/F_1$ = the predetermined dimension/the known dimension of the member, and
means, responsive after the first beam has scanned across the unknown dimension of the article and the second beam has scanned across the known dimension of the member, for generating a signal having a first state if the count subtracted from the counter is at least equal to the count advanced into the counter to indicate that the unknown dimension of the article is greater than the predetermined dimension, and having a second state if the count subtracted from the counter is less than the count advanced into the counter to indicate that the unknown dimension of the article is less than the predetermined dimension.

17. In a system as set forth in claim 16, wherein:
the means for imparting relative movement between the first beam and the article includes means for scanning the first beam along a path which crosses the article along the unknown dimension thereof;
the means for imparting relative movement between the second beam and the member includes means for scanning the second beam along a path which crosses the member along the known dimension thereof, at essentially the same velocity as the first beam crossed the article along the unknown dimension thereof, and
the detecting means includes photodetecting means, positioned on the sides of the article and member opposite from the sides thereof which intercept the first and second beams, for detecting the first and second beams which pass beyond the article and the member, respectively, without being intercepted thereby, and for generating signals in accordance therewith.

18. In the system as set forth in claim 17 wherein the means for scanning the first beam across the article, and the means for scanning the second beam across the member, sequentially scan the first beam across the article and the second beam across the member.

19. In a system for measuring the dimension of the overhang, with respect to a predetermined dimension, of each of first and second edges of an article over an individual one of associated first and second edges of a support on which the article is positioned, the first and second edges of the article and support being essentially parallel, the support having a known dimension between its first and second edges and extending, between its first and second edges, beyond the article:
means for scanning a pair of parallel beams of radiant energy along paths which scan the first beam across the article from the first to the second edge thereof, and the second beam across the support, along the portion of the support which extends beyond the article, from the first to the second edge thereof, for intercepting the first beam, from passing beyond the article, with the article between the first and second edges thereof, and for intercepting the second beam, from passing beyond the support, with the support between the first and second edges thereof, the beams being oriented such that a plane therebetween is parallel to the edges of the article and the support;

photodetecting means for receiving the first and second beams which pass beyond the article and support, respectively, and for generating signals in accordance with whether both beams are incident thereon, only one beam is incident thereon, or neither beam is incident thereon;

signal generating means for selectively generating a clock signal at a frequency $F_1$ or $F_2$;

first and second counters, each for receiving the clock signal from the signal generating means and for selectively increasing or decreasing the count therewithin at a rate in accordance with the frequency of the clock signal;

means, responsive to the signals from the photodetecting means, for applying a clock signal at the frequency $F_1$ from the signal generating means to the first counter to advance a count therein, at the frequency $F_1$, when the first beam is intercepted by the first edge of the article and until the second beam is intercepted by the first edge of the support;

means, responsive to the signals from the photodetecting means, for applying a clock signal at the frequency $F_2$ from the signal generating means to the first and second counters to subtract a count from the first counter, and to advance a count into the second counter, at the frequency $F_2$, when the second beam is intercepted by the first edge of the support and until the second beam scans across the second edge of the support, the frequencies $F_1$ and $F_2$ satisfying the ratio $F_2/F_1$ = the predetermined dimension/the known dimension of the support, means, responsive when the second beam scans across the second edge of the support, for generating a first signal having a first state if the count subtracted from the first counter is at least equal to the count advanced therein to indicate that the dimension of overhang of the first edge of the article over the first edge of the support is less than the predetermined dimension, and having a second state if the count subtracted from the counter is less than the count advanced therein to indicate that the dimension of overhang of the first edge of the article over the first edge of the support is greater than the predetermined dimension;

means, responsive to the signals from the photodetecting means, for applying a clock signal at the frequency $F_1$ from the signal generating means to the second counter for subtracting a count therefrom, at the frequency $F_1$, when the second beam scans across the second edge of the support and until the first beam scans across the second edge of the article, and means, responsive when the first beam scans across the second edge of the article, for generating a second signal having a first state if the count subtracted from the second counter is at least equal to the count advanced therein to indicate that the dimension of overhang of the second edge of the article over the second edge of the support is greater than the predetermined dimension, and having a second state if the count subtracted from the second counter is less than the count advanced therein to indicate that the dimension of overhang of the second edge of the article over the second edge of the support is less than the predetermined dimension.

20. In a system as set forth in claim 19, further including:

means, responsive to the signals from the photodetecting means, for generating a third signal having a leading edge occurring when the first beam is intercepted by the first edge of the article and a lagging edge occurring when the first beam scans across the second edge of the article, and for generating a fourth signal having a leading edge occurring when the second beam scans across the first edge of the support and a lagging edge occurring when the second beam scans across the second edge of the support.

21. In a system as set forth in claim 20, wherein:

the means, responsive to the signals from the photodetecting means for applying a clock signal at the frequency $F_1$ to the first counter to advance a count therein, includes means for detecting the leading edges of the third and fourth signals, and for advancing the count at the frequency $F_1$, into the first counter when the leading edge of the third signal is detected and until the leading edge of the fourth signal is detected;

the means, responsive to the signals from the photodetecting means, for applying a clock signal at the frequency $F_2$ to the first and second counters to subtract a count from the first counter, and to advance a count into the second counter, at the frequency $F_2$, includes means for detecting the lagging edge of the fourth signal, and for subtracting the count from the first counter, and advancing the count into the second counter, at the frequency $F_2$, when the leading edge of the fourth signal is detected and until the lagging edge of the fourth signal is detected, and the means, responsive to the signals from the photodetecting means, for applying a clock signal at the frequency $F_1$ to the second counter for subtracting a count therefrom, includes means for detecting the lagging edge of the third signal and for subtracting the count, at the frequency $F_1$, from the second counter when the lagging edge of the fourth signal is detected and until the lagging edge of the third signal is detected.

22. In a method of ascertaining a relationship between a linear dimension of a first member with respect to a known linear dimension of a second member:

imparting relative movement between the first member and a first detector to scan the first detector across the first member along the linear dimension thereof;

initiating the generation of a first pulse train upon the first detector passing over the origin of, and until the first detector passes over the termination of, the linear dimension of the first member;

counting and storing, from an initial count, the pulses of the first pulse train;

imparting relative movement between the second member and a second detector to scan the second detector across the second member along the known linear dimension thereof;

initiating the generation of a second pulse train upon the second detector passing over the origin of, and until the second detector passes over the termination of, the known linear dimension of the second member, the number of pulses in the second pulse train having a predetermined relationship with the number of pulses in the first pulse train when the ratio of the linear dimension of the first member to the known linear dimension of the second member is equal to a known constant;

applying the pulses of the second pulse train to sequentially subtract the stored pulse count, and generating an indication signal upon retention of a stored count which is indicative of the number of pulses in the second pulse train not having the predetermined relationship with the number of pulses in the first pulse train, and therefore of a ratio of the linear dimension of the first member to the known linear dimension of the second member that is not equal to the known constant.

23. In a manner of ascertaining a relationship between a known linear dimension of a first member with respect to a linear dimension of a second member:

imparting relative movement between the first member and a first detector to scan the first detector across the first member along the known linear dimension thereof;

initiating the generation of a first pulse train upon the first detector passing over the origin of, and until the first detector passes over the termination of, the known linear dimension of the first member;

counting and storing, from an initial count, the pulses of the first pulse train;

imparting relative movement between the second member and a second detector to scan the second detector across the second member along the linear dimension thereof;

initiating the generation of a second pulse train upon the second detector passing over the origin of, and until the second detector passes over the termination of, the linear dimension of the second member, the number of pulses in the second pulse train having a predetermined relationship with the number of pulses in the first pulse train when the ratio of the known linear dimension of the first member to the linear dimension of the second member is equal to a known constant;

applying the pulses of the second pulse train to sequentially subtract the stored pulse count, and generating an indication signal upon retention of a stored count which is indicative of the number of pulses in the second pulse train not having the predetermined relationship with the number of pulses in the first pulse train, and therefore of a ratio of the known linear dimension of the first member to the linear dimension of the second member that is not equal to the known constant.

* * * * *

UNITED STATES PATENT OFFICE
CERTIFICATE OF CORRECTION

Patent No. 3,854,052 Dated December 10, 1974

Inventor(s) M. P. Asar-H. L. Maddox

It is certified that error appears in the above-identified patent and that said Letters Patent are hereby corrected as shown below:

Column 1, lines 31 & 32, "original" should read --optical--. Column 2, line 12, "wire" should read --wired--. Column 7, line 30, "current" should read --contact--. Column 10, line 42, "induction" should read --indication--. Column 20, line 65, "alon" should read --along--.

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*